Figure 1:
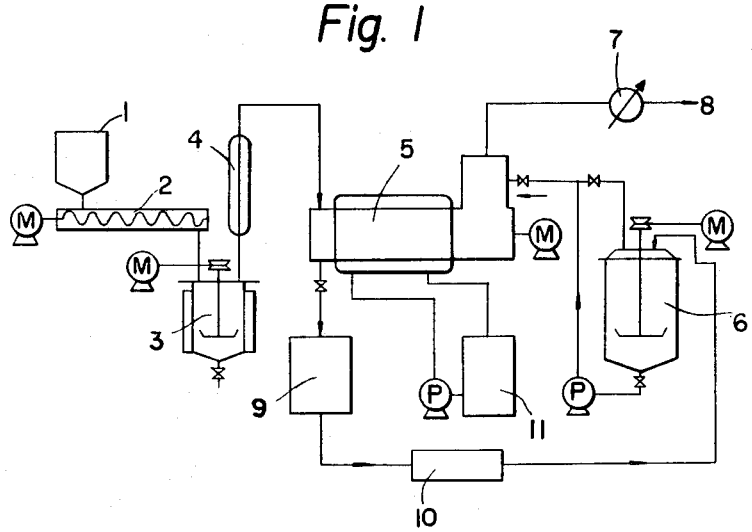

Aug. 10, 1965  AKIRA TAKAHASHI ETAL  3,199,265
METHOD OF PURIFYING ALDEHYDES AND THE APPARATUS THEREFOR
Filed Dec. 20, 1961

INVENTORS
AKIRA TAKAHASHI
YUKIMITSU MITA
SHIGEO HAYASHI
By
ATTORNEY

3,199,265
METHOD OF PURIFYING ALDEHYDES AND THE APPARATUS THEREFOR

Akira Takahashi, Kanagawa-ken, Yukimitsu Mita, Tokyo, and Shigeo Hayashi, Kanagawa-ken, Japan, assignors to Showa Denko Kabushiki Kaisha, Tokyo, Japan, a corporation of Japan
Filed Dec. 20, 1961, Ser. No. 160,879
Claims priority, application Japan, Mar. 2, 1961, 36/6,811
13 Claims. (Cl. 55—22)

This invention relates to a method of purifying aldehydes, particularly formaldehyde, and the apparatus therefor. More particularly, the invention relates to a method of purifying aldehydes using solid desiccating agents, and the apparatus therefor.

It is an object of the invention to provide a method of removing water and impurities such as formic acid and methanol that are contained in aldehydes, particularly formaldehyde.

Another object of the invention is to provide an industrially feasible method of removing continuously water and impurities such as formic acid, methanol, etc. that are contained in aldehydes, particularly formaldehyde.

Still another object of the invention is to provide an apparatus for practicing said method.

Other objects and advantages of this invention will be apparent from the description in detail thereof given hereinafter.

Polyoxymethylene having a high degree of polymerization made from formaldehyde by the aid of special polymerizing initiators is known as being a plastic of great value. And it is known that for obtaining polyoxymethylene of high degree of polymerization it is necessary to use formaldehyde containing as little as possible of impurities such as water, formic acid and methanol. In particular, the water contained in formaldehyde is said to hinder to the utmost the formation of polyoxymethylene of high degree of polymerization.

In view of this fact, formaldehyde used for preparing polyoxymethylene of high degree of polymerization is usually obtained by pyrolyzing paraformaldehyde. However, even in the formaldehyde gas obtained by such a method it is difficult to avoid the presence therein of the impurities such as water, formic acid and methanol. Particularly, in case of water, no matter how much the paraformaldehyde is dried and purified, because of the water that is structurally bonded, the presence of one to several percent of water cannot be avoided.

On the other hand, for preparing polyoxymethylene of high degree of polymerization it is necessary that formaldehyde whose water content si at most 0.5% by weight, preferably less than 0.1% by weight, be used. In view of this fact, a method, for example, of passing the formaldehyde gas resulting from the decomposition of paraformaldehyde through a trap cooled to 0- —30° C. thereby condensing and removing the water and other impurities contained in formaldehyde, and a method of forming hemiformal with alcohols such as cyclohexanol and pyrolyzing this hemiformal to obtain pure formaldehyde are known. However, in case of the former method there is the drawback that not only the yield of pure formaldehyde declines but also as a result of the polymerization of the formaldehyde the trap and pipings become clogged as to render impossible the continuous operation over a long period of hours. On the other hand, in case of the hemiformal method there being the necessity of producing an intermediate compound, the disadvantage from an operational as well as an economical standpoint cannot be avoided.

As to the method of removing the water contained in the formaldehyde although there are known, besides these, the washing method and the partial condensation method, these also while possessing advantages on one hand have inherent drawbacks. Thus the present state is that a fully satisfactory, industrially feasible method has not been found as yet for removing the water contained in formaldehyde.

As a result of much research on our part as to the method of removing the water contained in formaldehyde, we first experimented in passing a formaldehyde gas containing water through a tube packed with a solid desiccating agent such as, for example, calcium chloride. The result was that although at first the water contained in the formaldehyde was removed extremely well, the desiccating efficiency gradually declined while, on the other hand, the formaldehyde was polymerized in the packed tube as to block it up. Hence, it was found that this method also had the same fault as the cold trap method and could not be practiced on an industrial scale. We also tried the heating of the packed tube and the formaldehyde gas in this case for prevening the polymerization of the formaldehyde in the packed tube. Although we were able to prevent polymerization of the formaldehyde by doing so, we could not remove the water from the formaldehyde as hoped for, since with the rise in temperature the desiccating efficiency of the solid desiccating agent packed in the tube dropped abruptly.

We also passed formaldehyde gas containing water directly through a solvent that was inert with respect to formaldehyde. The result was that at a low temperature in the vicinity of room temperature the formaldehyde polymerized and moreover hardly any observable desiccating effects took place.

However, when we passed formaldehyde gas containing water through a solvent inert with respect to formaldehyde and containing a solid desiccating agent, for example, calcium chloride, etc., surprisingly we found that the polymerization hardly occurred even at room temperature, and moreover the rate of desiccation of the water contained in the formaldehyde gas was very excellent, and in addition that the desiccation rate did not decline even after long hours of continuous operation. Thus the invention was arrived at.

According to this invention, not only is the water contained in the formaldehyde gas removed, but also the impurities such as formic acid and methanol are also removed to a considerable extent. Additionally, the loss of formaldehyde can be said to be substantially nil.

In practicing the invention, the formaldehyde gas containing impurities such as water may be passed through a solvent inert with respect to aldehydes and containing a solid desiccating agent that has been formed, for example, by suspending a solid desiccating agent in a solvent inert with respect to formaldehyde, or alternatively by packing a solid desiccating agent in a tube or a tower and filling the interstices thereof with a solvent inert with respect to formaldehyde thereby constituting a kind of a fixed bed.

While according to the invention the solvent containing the aforementioned solid desiccating agent may contain the solid desiccating agent in any state whatsoever, the instance in which the solid desiccating agent is contained in a suspended state is most preferable from the standpoints of its desiccation rate and the continuance of its high rate of desiccation. For preventing the sedimentation of the solid desiccating agent in a solvent containing the solid desiccating agent in a suspended state, it is preferred that this be usually performed by stirring. When required, a baffle plate, etc. may be provided for achieving a more effective contact between the formaldehyde gas and the solids.

As methods for passing the formaldehyde gas through the solvent phase containing the solid desiccating agent the continuous as well as the batch methods may be employed. For example, from a desiccation tank wherein is contained in a solvent inert with respect to formaldehyde a solid desiccating agent in a suspended state, a part of said suspension may be drawn off continuously while on the other hand a fresh supply of the suspension is introduced constantly, and meanwhile the formaldehyde gas containing the impurities is fed from the bottom of the tank in a bubbling fashion. On the other hand, in case of the batch method, switching may be performed from a desiccation tank which has lost its desiccating ability to a desiccation tank disposed alongside which contains a fresh supply of solvent containing the solid desiccating agent. And, if necessary, two or more desiccation tanks may be connected together.

Furthermore, in practicing this invention, the hereinbefore-described cooling traps may also be used together as a step following the purification treatment according to the invention. Thus, the desiccation can be performed with still greater effectiveness.

As there is a possibility of polymerization being induced by the acidic desiccating agents such as silica and alumina when used as the solid desiccating agents, in the invention the neutral solid desiccating agents such as, for example, calcium chloride, sodium sulfate, calcium sulfate, etc. are used. Among the solid desiccating agents, in view of the fact that it can take six molecules of water of crystallization and accordingly has a great desiccating ability, and moreover because it is readily available industrially, calcium chloride is the most suitable.

The solid desiccating agents, when being suspended in a solvent according to the invention may be a fine powder or any size as long as it is suspendable in the solvent. And while desiccation effects can be manifested no matter how small the quantity is of the solid desiccating agent that is added to the solvent, the preferred quantity is from several percent to ten percent.

The solvents which are inert with respect to formaldehyde that are used in the invention include the aromatic hydrocarbons such as, for example, benzene, toluene, xylene, alicyclic hydrocarbons, such as cyclohexane and alkyl cyclohexane and the aliphatic hydrocarbons having five or more carbon atoms and capable of maintaining its liquid state at operational temperatures such as, for example, pentane, hexane, heptane, octane, nonane, decane, etc.

When a formaldehyde gas containing water is passed at room temperature or lower through a desiccation tank of solvent containing a solid desiccating agent in a suspended state, as described hereinabove, the polymerization of formaldehyde rarely ever occurs. Polymerization of formaldehyde becomes substantially nil when this temperature of the desiccation bath is made to be between room temperature and about 70° C. Furthermore, since the formaldehyde usually used is prepared by the pyrolysis of paraformaldehyde, and in the first place has been heated to above about 60° C., the temperature control also becomes easy to perform. Generally, the temperature of the solvent may be any temperature that is above the temperature at which said solvent does not freeze but less than its boiling point.

According to the invention, the solid desiccating agent that has lost its activity after having been used once can be used over again after being reactivated by further desiccation treatment.

While, for the sake of convenience, the invention has been described in detail with reference to a formaldehyde gas containing water, it can, in general, be also applied for removing water from any of the saturated and unsaturated aldehydes that can maintain a stable gaseous state at the temperature at which the purification operations of the invention are performed, i.e., from room temperature to 70° C.

As such aldehydes there can be named, for example, acetaldehyde (B.P. 21° C.), propionaldehyde (B.P. 48.8° C.), acrolein (B.P. 52.5° C.), propiolaldehyde (B.P. 61° C.), etc.

The method of the invention which has been described in detail hereinabove is advantageously practiced in the purification continuously of the aldehydes by employment of the apparatus to be described hereinafter.

Figure 2:
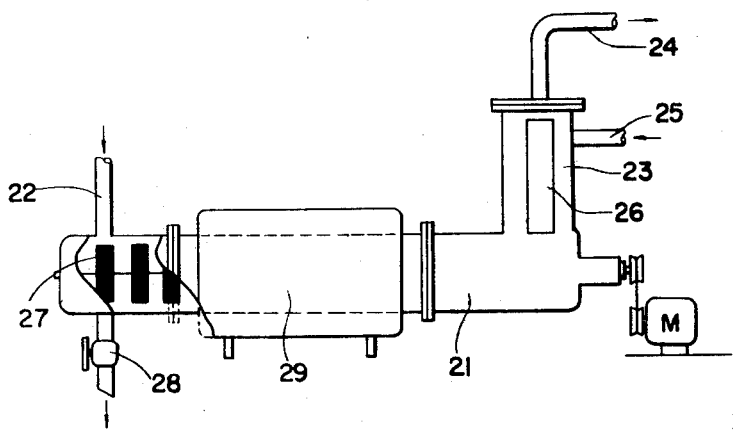

This continuous apparatus is illustrated in the accompanying drawings, in which:

FIG. 1 is a process chart of the method of purifying formaldehyde according to the present invention; and FIG. 2 is a magnified sectional view of the essential parts of the horizontal desiccation and purification apparatus 5 shown in FIG. 1.

Referring more specifically to the drawings, in FIG. 1 the material paraformaldehyde in a storage tank 1 is conveyed by means of a screw feeder 2 and enters a paraformaldehyde pyrolyzer 3. The unrefined formaldehyde gas that is evolved here by pyrolysis passes through a cooler 4 and is introduced into a horizontal desiccation and purification apparatus 5.

The horizontal desiccation and purification apparatus is filled with a slurry that is fed from a storage tank 6 containing a slurry of a solid desiccating agent obtained by adding to solvent a solid desiccating agent such as, for example, calcium chloride. In the horizontal desiccation and purification apparatus 5, the unrefined formaldehyde gas after being puried by making thorough contact with the slurry of desiccating agent passes through a gas meter 7 and a pipe 8 and then is fed to the polymerization system. In this case, since the purifying capacity of the slurry of a solid desiccating agent in the horizontal desiccation and purification apparatus 5 is decreased or lost if it absorbs more than a certain amount of water, the waste liquid of slurry is discharged into a storage tank 9, and after going through a suitable drying step 10 is again returned to the storage tank 6 to be used over again. As to the temperature of the inside of the horizontal desiccation and purification apparatus 5, the maintenance of the desired temperature is controlled by circulation of the hot water from the temperature regulating water tank 11. In the meantime, by constantly and continuously discharging a part of the slurry of the horizontal desiccation and purification apparatus 5 into the storage tank 9, and on the other hand, by feeding to said desiccation and purification apparatus 5 a fresh supply of slurry from the storage tank 6 in an amount equivalent to that discharged, the desiccation and purification of the aldehydes can be carried out continuously.

FIG. 2 is a magnified sectional view showing the essential parts of the horizontal desiccation and purification apparatus 5 shown in FIG. 1. This horizontal desiccation and purification apparatus comprises a long horizontal desiccation and purification tank 21 that is substantially airtight and provided in its interior with agitating vanes 27. The horizontal desiccation and purification tank 21 at its upper part at one end is provided with an aldehyde feed pipe 22 and at its other end with a cylindrical member 23. To this cylindrical member 23 there are fixed an aldehyde gas outlet 24 and a feed pipe 25 for feeding the slurry of the solid desiccating agent. The unrefined formaldehyde gas fed from the feed pipe 22 enters in the horizontal desiccation and purification tank 21 that is filled with the slurry of the solid desiccating agent fed from the pipe 25, and after making thorough contact with the solid desiccating agent said gas proceeds to the polymerization system via the cylindrical member 23 and the outlet 24. The level of the slurry in the horizontal desiccation and purification tank 21 is suitably regulated by means of the level gauge 26. In correspondence with a decrease in the water removal capacity of the solid desiccating agent in the slurry, the slurry is drawn off by opening a valve 28 while continuing stirring thereof with the agitating vanes 27.

29 is the temperature regulating jacket whereby the temperature of the slurry in the desiccation and purification tank 21 is regulated.

The advantages in employing a horizontal desiccation and purification apparatus illustrated in FIGS. 1 and 2 in this invention are as follows: Namely, when such an apparatus as the above is used, the unrefined formaldehyde gas can be made to effect contact with the slurry in the dessication and purification tank 21 readily with the impartation of only a very small amount of gas pressure; moreover, with agitating vanes 27 being provided in said desiccation and purification tank 21, by means of its stirring action the unrefined formaldehyde gas that is fed from the feed pipe 22 at all times makes contact with a fresh supply of the solid desiccating agent to be purified and dried. Thus, such troubles as clogging of the feed pipe 22 and the tank 21 as a result of the polymerization of unrefined formaldehyde does not occur. These advantages cannot possibly be realized when the tank is designed as a vertical type.

While in FIGS. 1 and 2 only the essential parts of an apparatus adapted to the purification of aldehyde gas according to the invention have been illustrated, it is to be understood that further modifications thereof by those skilled in the art are possible. According to the invention, if necessary, two or even more of the afore-described horizontal desiccation and purification tanks 21, as shown in FIG. 2, may be provided in combination, or the gas that has been discharged from said desiccation and purification tank may be recirculated again, or following said desiccation and purification tank 21 a known cooling trap device may be provided, etc., thereby to enhance still further the desiccation and purification effects.

To further illustrate the present invention and advantages thereof, the following examples are given, it being understood that these are merely intended in an illustrative sense, and the invention should not be limited thereby, but only insofar as the same may be limited by the appended claims.

*Example 1*

Dried paraformaldehyde was filled in a decomposing tank, 60 cm. in height and 15 mm. in diameter, and was pyrolyzed continuously at the rate of 1 gram/min. by moving a movable electric furnace from the upper part of the tank to the bottom thereof, thereby to evolve a gas of uniform composition. The water content of this gas was 1.56%. This gas was introduced via a pipe heated to 100° C. into a jacketed horizontal desiccation tank, 45 mm. in diameter and 40 cm. in length, wherein had been suspended 60 grams of granular anhydrous calcium chloride in ca. 600 cc. of heptane and which was being vigorously agitated, from the inlet thereof. The introduced gas in the form of minute bubbles was made to contact the solvent containing the desiccating agent calcium chloride in the desiccation tank and was thereafter removed from the outlet of the tank.

When the temperature of the desiccation tank was maintained at 12° C., upon passing the formaldehyde gas for 15 minutes therethrough, purified formaldehyde gas was obtained with a yield of almost 100%, there being observed only a minute amount of polymeric material in the tank. The water content in the gas was 0.08%

In this connection, when the aforesaid formaldehyde gas was passed at this same temperature through a tank of the solvent heptane without adding the desiccating agent calcium chloride, the polymerization to a marked extent occurred, there being formed a large amount of polymeric formaldehyde in the tank as well as in the pipes. Moreover, the gas that was discharged from the tank had a water content of 1.5%, the same amount as in the material gas.

*Example 2*

The same method and materials were used as in Example 1, except that the quantity of the desiccating agent was made 30 grams, i.e., one half as large, and the temperature of the desiccation tank was maintained at 40° C. In this case, during the 15 minutes of operation, as compared with the case of Example 1, the difference was that there was completely no formation of polymeric material at all and formaldehyde gas that was substantially anhydrous of which water content being 0.06% was obtained with a yield of 100%.

For the sake of information, when this purified gas was introduced at 15° C. into 400 cc. of n-heptane containing 0.005% by weight of tri-n-butylamine as polymerization initiator, high-molecular-weight polyoxymethylene was obtained. The inherent viscosity of the polymer obtained was 1.0 (measured at 60° C. on a solution in which 0.5% by weight of the polymer was dissolved in p-chlorophenol containing 2% by weight of alphapinene), and it was a valuable high-molecular-weight polyoxymethylene for plastic use.

*Example 3*

As in Example 1, a formaldehyde gas containing 1.5% of water was passed at 42° C. through a desiccation tank of similar construction as in Example 1 which contained 600 cc. of benzene in which was suspended 60 grams of anhydrous sodium sulfate whereby was obtained a formaldehyde gas having a water content of 0.22%. During the 15 minutes of operation no formation of polymeric formaldehyde was observed at all. By passing this gas through a completely idential second desiccation tank the water content was reduced to 0.1%.

What is claimed is:

1. A method of purifying aldehydes which comprises passing in a gaseous form an aldehyde containing water through an inert liquid hydrocarbon containing a solid desiccating agent.

2. The method as claimed in claim 1 in which said aldehyde is formaldehyde.

3. The method as claimed in claim 1 in which said solid desiccating agent is a neutral solid desiccating agent.

4. The method as claimed in claim 1 in which said solid desiccating agent is selected from the group consisting of calcium chloride, sodium sulfate, and calcium sulfate.

5. The method as claimed in claim 1 in which said liquid hydrocarbon is selected from the group consisting of the aromatic hydrocarbons, the acyclic aliphatic hydrocarbons having at least about 5 carbon atoms, and the alicyclic hydrocarbons.

6. The method according to claim 5, wherein said liquid hydrocarbon is benzene.

7. The method according to claim 5, wherein said liquid hydrocarbon is heptane.

8. A method of purifying aldehydes which comprises passing an aldehyde containing water through an inert liquid hydrocarbon selected from the group consisting of aromatic hydrocarbons, acyclic aliphatic hydrocarbons having at least about 5 carbon atoms, and alicyclic hydrocarbons containing a solid desiccating agent, said passage being effected at a temperature below about 70° C.

9. The method as claimed in claim 1 in which said solid desiccating agent is in suspension in said liquid hydrocarbon.

10. A desiccation and purification apparatus of aldehyde gas comprising a substantially airtight vessel long in the horizontal direction and having agitating vanes provided in the interior thereof for agitating a mixture of aldehyde gas and a slurry of a solid desiccating agent, a feed pipe of aldehyde gas disposed on the upper part of said vessel at its one end, and a cylindrical member disposed on the upper part of said vessel at the other end thereof, said cylindrical member being equipped with a discharge outlet for the purified aldehyde and a feed pipe for a slurry of a solid desiccating agent, and said vessel being further provided with an outlet for discharging the exhaust slurry of said solid desiccating agent, and liquid level control means so that the level of said slurry of said solid desiccating agent in said vessel is maintained at a height such that said agitating vanes are in contact with said slurry.

11. The method according to claim 1, wherein said passing is carried out at a temperature below about 70° C.

12. The method according to claim 8, wherein said liquid hydrocarbon is heptane.

13. The method according to claim 8, wherein said liquid hydrocarbon is benzene.

References Cited by the Examiner

UNITED STATES PATENTS

| | | | |
|---|---|---|---|
| 900,062 | 9/08 | Ernst | 55—86 |
| 1,866,560 | 7/32 | Gordon et al. | |
| 2,183,943 | 12/39 | Reich | 261—21 |
| 2,810,455 | 10/57 | Veltman | 55—22 |

REUBEN FRIEDMAN, *Primary Examiner.*

HERBERT L. MARTIN, *Examiner.*